(12) United States Patent
Seki et al.

(10) Patent No.: US 6,961,948 B2
(45) Date of Patent: Nov. 1, 2005

(54) DISK HOLDING DEVICE

(75) Inventors: Kouji Seki, Tokyo (JP); Sadamu Matsuda, Tokyo (JP); Yukio Komazaki, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 252 days.

(21) Appl. No.: 10/276,600

(22) PCT Filed: May 18, 2001

(86) PCT No.: PCT/JP01/04149

§ 371 (c)(1),
(2), (4) Date: Apr. 21, 2003

(87) PCT Pub. No.: WO01/88914

PCT Pub. Date: Nov. 22, 2001

(65) Prior Publication Data

US 2003/0156507 A1    Aug. 21, 2003

(30) Foreign Application Priority Data

May 19, 2000    (JP)    .............................. 2000-148553

(51) Int. Cl.⁷ ............................................. G11B 17/22
(52) U.S. Cl. ..................................................... 720/621
(58) Field of Search ................................ 720/621, 615, 720/614, 619, 620; 369/30.81, 30.82, 30.83

(56) References Cited

U.S. PATENT DOCUMENTS

| | | | | |
|---|---|---|---|---|
| 4,864,551 A | * | 9/1989 | Tomita et al. | 369/30.88 |
| 5,933,403 A | * | 8/1999 | Kim et al. | 720/615 |
| 5,970,042 A | * | 10/1999 | Fujimoto et al. | 369/30.78 |
| 6,473,372 B2 | * | 10/2002 | Yoshida et al. | 369/30.9 |
| 6,751,181 B1 | * | 6/2004 | Watanabe et al. | 369/192.1 |
| 2001/0040856 A1 | * | 11/2001 | Watanabe et al. | 369/192 |

* cited by examiner

Primary Examiner—William Korzuch
Assistant Examiner—Mark Blouin

(57) ABSTRACT

On a loading block LB, there are provided a wire 1 having spring properties and two rollers (disk pressing sections) 2 made of rubber that are capable of rotating about this wire 1 as their rotary shaft. One end of the wire 1 is coupled with a cam hole 4a provided in a large-diameter gear (rotary member) 4 of the loading block LB through a linking plate (operating member) 3 and a coupling pin 3a provided on this linking plate 3, so that the rollers 2 are subjected to drive control between a pressing position and a release position by the operation of this cam hole 4a. During disk feeding or clamping action, the disk D can be pressed against the disk holder DH by pressing the rollers 2 against the disk D.

20 Claims, 10 Drawing Sheets

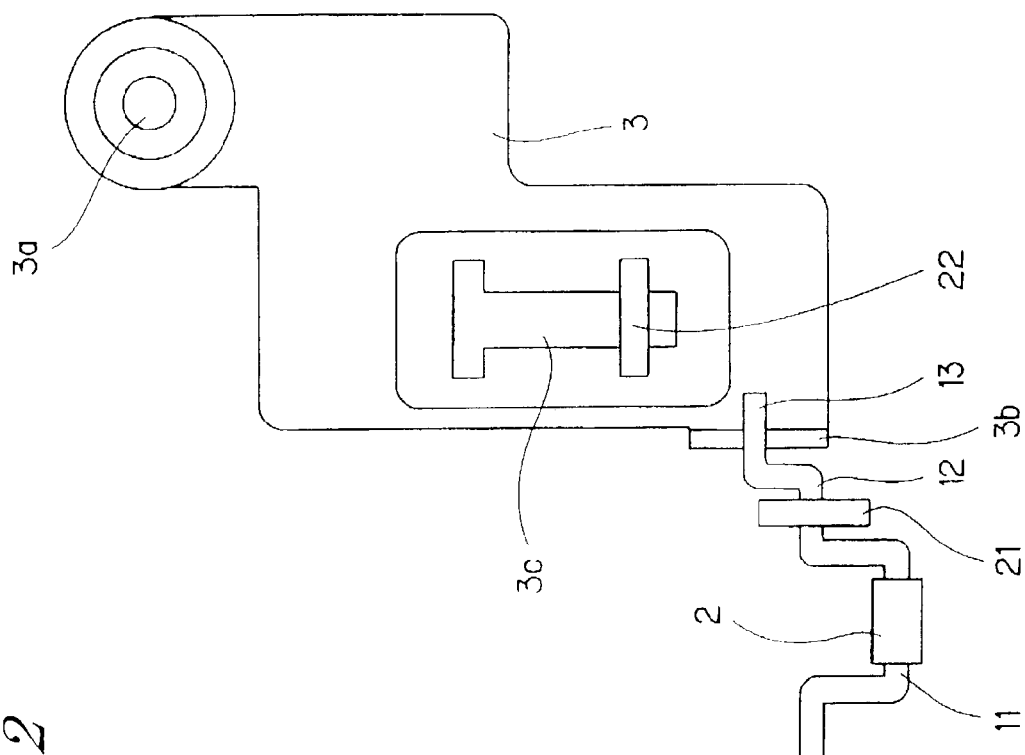
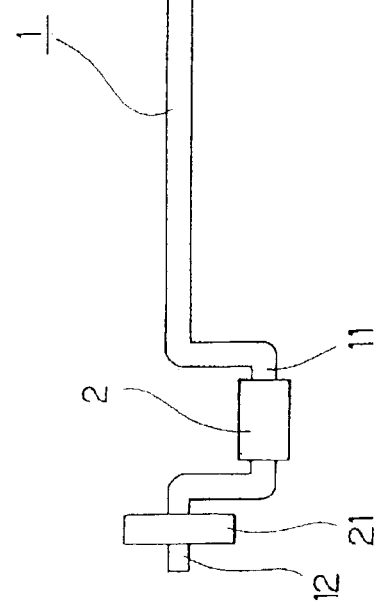
FIG. 2

FIG. 3
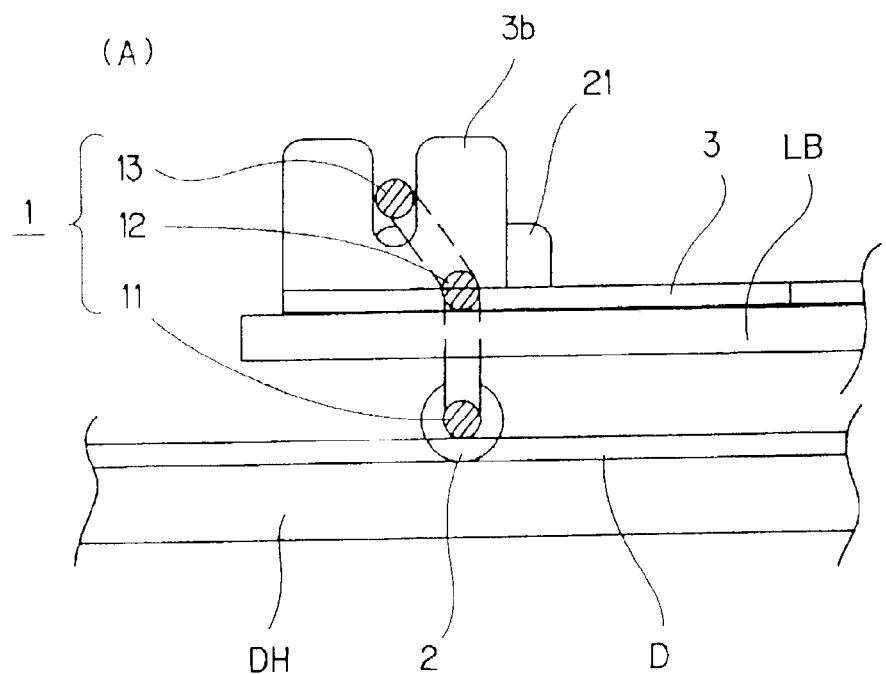
(A)
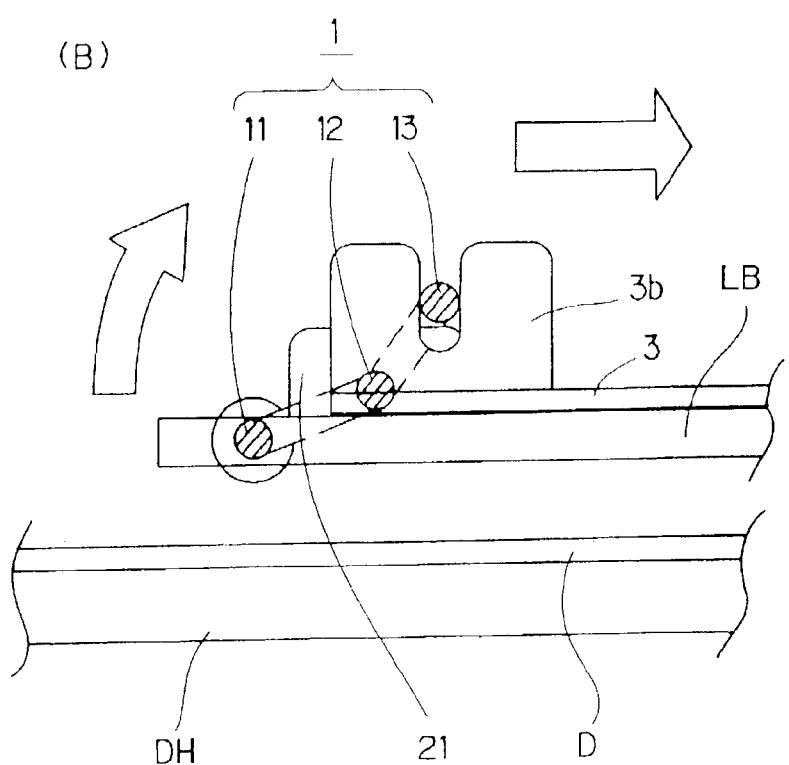
(B)

DISK HOLDING DEVICE

This application is a 371 of PCT/JP01/04149 Mar. 18, 2001

TECHNICAL FIELD

The present invention relates to a magazine-type disk change device and in particular relates to a disk holding device for pressing the surface of a disk against a disk holder during disk feed.

BACKGROUND ART

Conventionally, in disk players of the type in which an optical disk signal is read, such as a CD player or DVD player, in order to perform continuous playing of a plurality of disks in a smooth fashion, a disk change device of a type in which a magazine that accommodates a plurality of disks is employed and disks are selectively extracted from within this magazine and played back continuously is employed.

When continuous playback of a plurality of disks is to be performed using such a magazine type disk change device, continuous playback in smooth fashion whilst automatically changing a plurality of disks in a short time can be achieved just by designating the next disk to be played back using input means such as a control button or just by programming beforehand the sequence of a plurality of disks that are to be played back. In this case, an excellent feeling in use can be obtained since such disk change does not require the performance of a manual operation and the time required for disk changing is greatly reduced compared with disk change involving a manual operation.

In some magazine type disk change devices as described above, in particular small sized disk change devices for in-vehicle use or the like, a magazine accommodating a plurality of disks in stacked fashion is arranged such that the surfaces of the disks are in the horizontal direction and is constructed such that the disk drive and disk feed section can be raised and lowered with respect to the magazine. In this case, the magazine is constructed such that a plurality of disk holders on which the disks are placed is accommodated therein in stacked fashion and such that each of the disk holders can be separately extracted. In a disk change device of this type, when disk changing is performed, specifically the following series of operations is performed.

First of all, a disk that has been played is released from the turntable and held in a corresponding disk holder (clamp-release action). This is followed by return of the disk held in the disk holder to its accommodated position in the magazine, by return of this disk holder into the magazine (unloading action).

After this, the disk drive and disk feed section are raised or lowered and located in position (raising/lowering action) in accordance with the height of the disk holder holding the next disk to be played back. Next, a disk is moved to a prescribed position on the turntable (loading action) by extracting this disk holder from the magazine. Next, when the disk has reached the prescribed position, it is held on the turntable and released from the disk holder (clamping action).

In order to prevent inconveniences such as the disk being damaged or becoming incapable of being fed due to separation from the disk holder it is necessary that the surface of the disk should be pressed against the disk holder during disk feeding or clamping as described above.

A pressing system using a plate spring provided on the loading chassis, which is the base member of the feed section, is therefore generally employed. This pressing system using a plate spring serves to press the surface of the disk on the opposite side against the disk holder by pressing the disk surface by means of the plate spring during disk feeding.

However, a disk change device of the conventional magazine type as described above is subject to the following problems.

First of all, with a disk change device in which a pressing system using a plate spring is adopted, there is a possibility of causing damage due to rubbing on the disk surface portion that contacts with the plate spring during disk feeding or clamping. Also, in addition to the fact that the load on the drive system is increased by the need to secure the increased drive force that is necessary for feeding because of the amount of friction produced between the plate spring and the disk surface, the load on the drive system is also increased due to the need to ensure mechanical strength sufficient to withstand this drive force etc.

To deal with this, consideration has been given to pressing the surface of the disk against the disk holder by providing a groove or the like for engaging the edge of the disk in the disk holder itself. However, if this is done, although disks having standard dimensions can be coped with, disks having non-standard dimensions cannot be coped with.

The present invention was proposed in order to solve the above problems of the prior art. An object of the present invention is to provide a disk holding device of high operational reliability which is compact and uncomplicated whereby the surface of a disk can be pressed against a disk holder during disk feeding or clamping without causing damage to the disk surface and without increasing the load on the drive system and a wide range of disks having non-standard dimensions can be coped with.

DISCLOSURE OF THE INVENTION

According to the present invention, in order to solve the above problem, the disk surface can be pressed against the disk holder without damaging the disk surface and without increasing the load on the drive system during disk feeding and clamping by pressing a roller against the disk surface.

According to the present invention, a disk holding device in a disk change device capable of accommodating a plurality of disk holders carrying disks, wherein the disk surface is pressed against the disk holder during disk feed an/or clamping is characterized by comprising a disk pressing section, a drive control section and a wire having spring properties. Of these, the disk pressing section is arranged so as to be capable of operation between a pressing position in which it presses against the surface of the disk and a release position in which it is released from the disk. Also, the drive control section is adapted to perform drive control of the disk pressing section between the pressing position and the release position. Further, the wire having spring properties is adapted to urge the disk pressing section.

With this disk holding device, during disk feeding or clamping, by drive control of the disk pressing section into the pressing position by means of the drive control section, the disk pressing section is made to press against the surface of the disk, thereby enabling the surface of the disk on the opposite side to be pressed against the disk holder. In this case, the disk pressing section can be pressed against the surface of the disk reliably by utilizing the urging force of the wire having spring properties. Also, since the disk pressing section is driven and controlled into the pressing position only when necessary, but when pressing is unnecessary the disk pressing section can be subjected to drive control into the release position, the load on the disk or drive system caused by pressure applied by the disk pressing section can be kept to a minimum. Further, thanks to the wire having spring properties the constitution in the vicinity of the disk pressing section can be made extremely compact and simplified. In addition, the wire can easily be subjected to processing such as severing or bending so this is even more advantageous from the point of view of productivity of the device.

In one embodiment of the present invention, the disk pressing section is a roller that is capable of rotation. With this disk holding device, during loading action or unloading action, by drive control of the roller into the pressing position, the surface on the opposite side of the disk is pressed against the disk holder by the roller maintaining this pressing condition whilst it rotates over the surface of the moving disk. In this case, the roller performs relative movement with respect to the disk whilst continuously pressing its surface against the disk surface, without rubbing the disk surface. Consequently, there is no possibility of causing damage to the disk surface during disk feed or of increasing the load on the drive system, as there is in the case where a fixed plate spring is employed.

The roller is preferably formed of resilient material. If a roller made of resilient material is employed, impact force accompanying contact of the roller and the disk surface can be absorbed, so a more stable disk feed action can be achieved.

In one embodiment of the present invention, the disk pressing section is a part of the wire. Thanks to the adoption of a construction in which the disk pressing section and the resilient body that urges this are constituted solely of the wire, the constitution in the vicinity of the disk pressing section can be made extremely compact and simplified. The constitution solely of the wire is even more advantageous from the point of view of the productivity and assembly of the device.

In one embodiment of the present invention, the disk pressing section is urged by a resilient body. With this disk holding device, the disk pressing section can be pressed against the surface of the disk reliably by utilizing the urging force of the resilient body. The resilient body that urges the disk pressing section is preferably formed of wire having spring properties. If this is done, the constitution in the vicinity of the disk pressing section can be made compact and simplified. Also, since wire is easily subjected to processing such as severing or bending, this is advantageous from the point of view of productivity also.

In one embodiment of the present invention, the drive control section comprises a cam that is provided on a rotary member for disk feeding and/or clamping and an operating member that performs drive control of the disk pressing section between the pressing position and the release position by operation driven by this cam. With this disk holding device, since the disk pressing section can be controlled and driven according to the rotation of the rotary member, the position of the disk pressing section can be suitably changed over matching the operating timing of the disk feed action and/or clamping action. Also, since an existing rotary member for disk feeding is utilized, the constitution of the drive control section can be made extremely compact and simplified.

In one embodiment of the present invention, the drive control section is arranged so as to control the disk pressing section into the pressing position at least during disk clamping. With this holding device, when the disk holder is extracted to a position in which it is capable of being clamped, the surface of the disk is pressed against the disk holder by this disk pressing section, thereby preventing displacement of the disk, so the reliability of the clamping action can be improved.

BRIEF DESCRIPTION OF THE DRAWINGS

FIG. 2 is a cross-sectional view to a larger scale illustrating a main part of the disk holding device illustrated in FIG. 1;

FIG. 3 is a side view illustrating the action of a wire and roller of the disk holding device illustrated in FIG. 1, (A) illustrating the pressing condition and (B) illustrating the release condition, respectively;

BEST MODE FOR CARRYING OUT THE INVENTION

Embodiments of a disk holding device according to the present invention applied to a disk change device of a CD player are described in detail below with reference to the drawings.

[1. First Embodiment]

[1—1. Construction]

Figure 1:
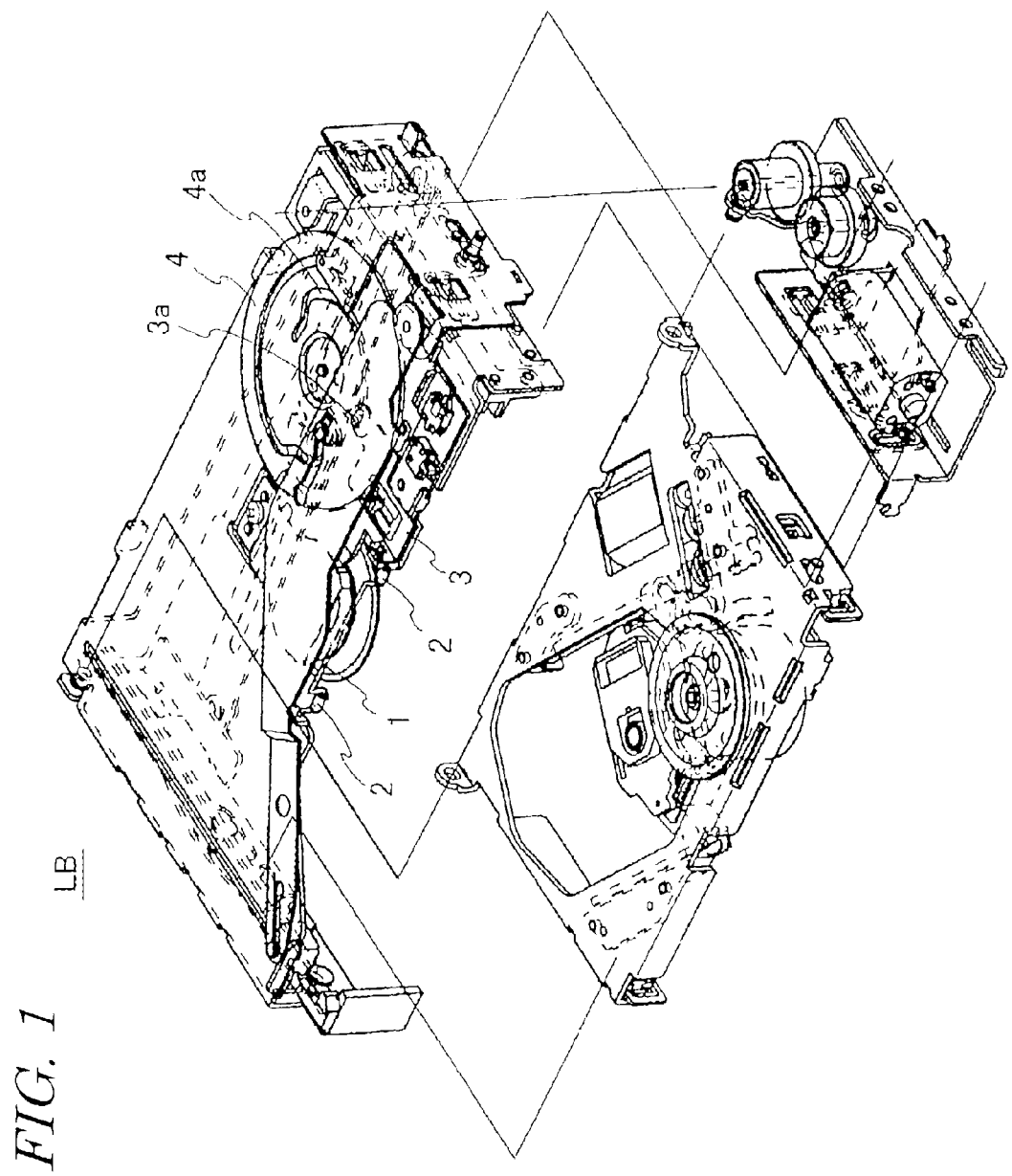
FIG. 1 is an exploded perspective view illustrating a loading block of a disk change device having a disk holding device according to a first embodiment of the present invention.

First of all, the construction of a first embodiment is described with reference to FIG. 1 and FIG. 2. FIG. 1 is an exploded perspective view illustrating a loading block of a disk change device having a disk holding device according to this embodiment. FIG. 2 is a plan view to a larger scale illustrating a main part of the disk holding device.

In FIG. 1, a large number of components constituting the loading block are illustrated, but, since the loading block itself is not the subject of the present invention, only the construction of the disk holding device is described hereinbelow.

As shown in FIG. 1, on the loading block LB there are provided a wire 1 having spring properties and two rollers (disk pressing sections) 2 made of rubber that are capable of rotating about this wire 1 as the axis of rotation. One end of the wire 1 is coupled with a cam hole 4a provided in a large-diameter gear (rotary member) 4 of the loading block LB, through a linking plate (operating member) 3 and a coupling pin 3a provided on this linking plate 3. Thus, by operation of this cam hole 4a, drive control of the rollers 2 is effected between a pressing position in which they press on the surface of the disk and a release position in which they are separated from the disk. Although the wire 1 functions as a resilient body that urges the rollers 2 by means of its spring properties, it does not need to have outstanding spring properties. In fact it is not necessarily essential for the wire 1 to have spring properties.

In more detail, as shown in FIG. 2, the wire 1 comprises a central section which extends in straight-line fashion and bent sections respectively formed at both ends thereof. Furthermore, at one of the bent sections of the wire 1, there are successively formed, from the middle towards the tip, an operating shaft or a roller shaft 11 and a swiveling shaft 12 and at the other bent section there is formed a coupling shaft 13, in addition to a roller shaft 11 and a swiveling shaft 12.

In this case, the shafts 11 to 13 are arranged in parallel with gaps therebetween. The roller shafts 11 rotatably support the rollers 2 as the rotary shafts of the rollers 2. Also, the swiveling shafts 12 are rotatably supported on bearings 21 provided on the loading block LB and the coupling shaft 13 is rotatably supported on a bearing 3b provided in the linking plate 3.

On the other hand, on the linking plate 3, in addition to the bearing 3b that supports the coupling shaft 13 of the wire 1 and the coupling pin 3a that is inserted in the cam hole 4a, there is provided a linear guide hole 3c. The linking plate 3 is capable of sliding action in the direction of the guide hole 3c by insertion of the guide projection 22 provided on the loading block LB in this guide hole 3c.

Also, the large-diameter gear 4 is a member that rotates in order to perform the disk feeding action. During the operation of both of the loading action and the clamping action, it rotates continuously in the clockwise direction in the drawing; during the operation of both of the clamping release action and the unloading action, it rotates continuously in the anti-clockwise direction in the drawing. The cam hole 4a of the large diameter gear 4, during the loading action and unloading action, holds the rollers 2 in the pressing position and, matching the timing of the clamping action and the clamping release action, moves the rollers 2 between the pressing position and the released position.

[1-2. Action]

Next, the action of the disk holding device according to this embodiment constructed as above will be described with reference to FIG. 3 to FIG. 6.

Figure 4:
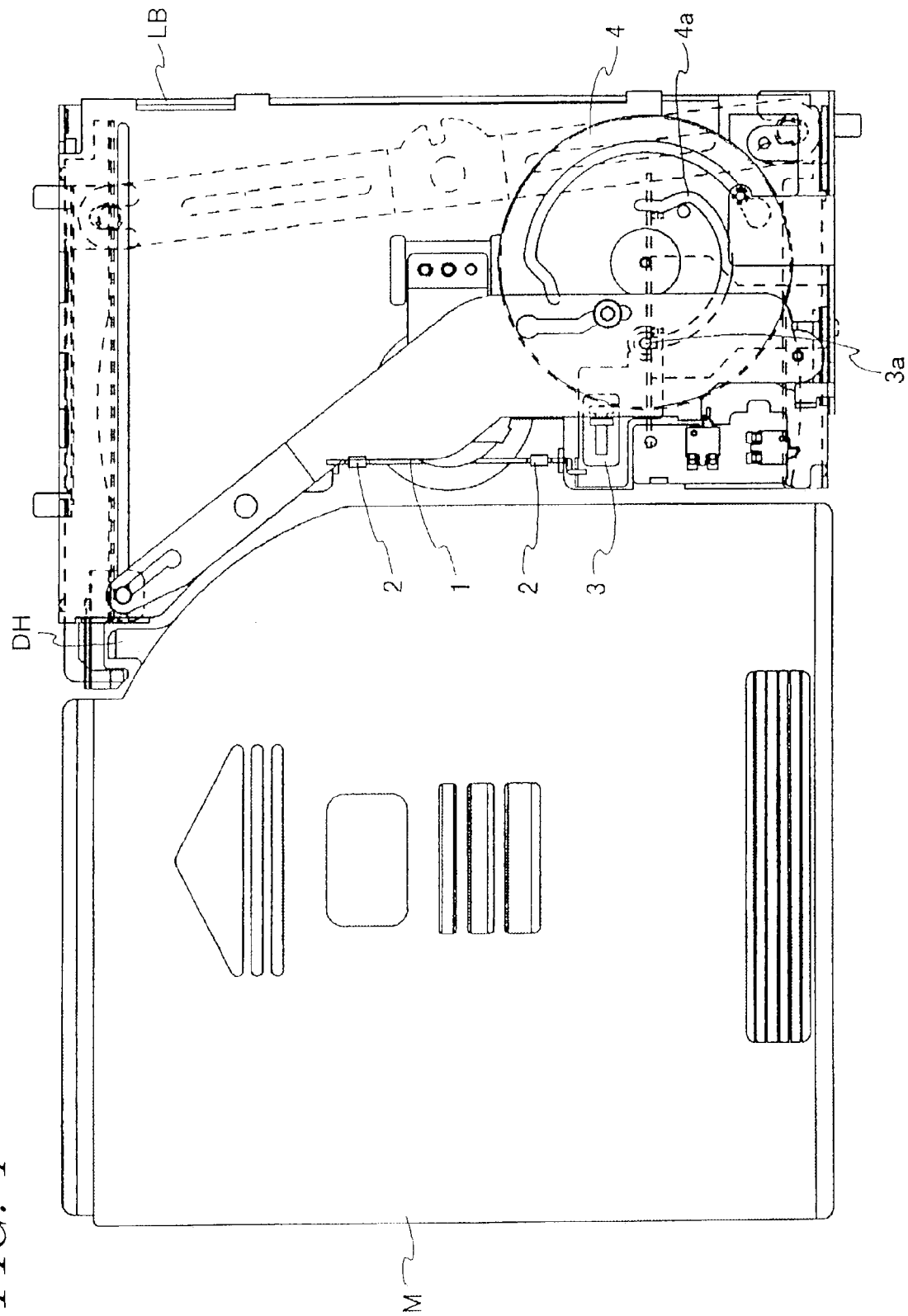
FIG. 4 is a plan view illustrating the initial condition of the disk change device shown in FIG. 1.
Figure 5:
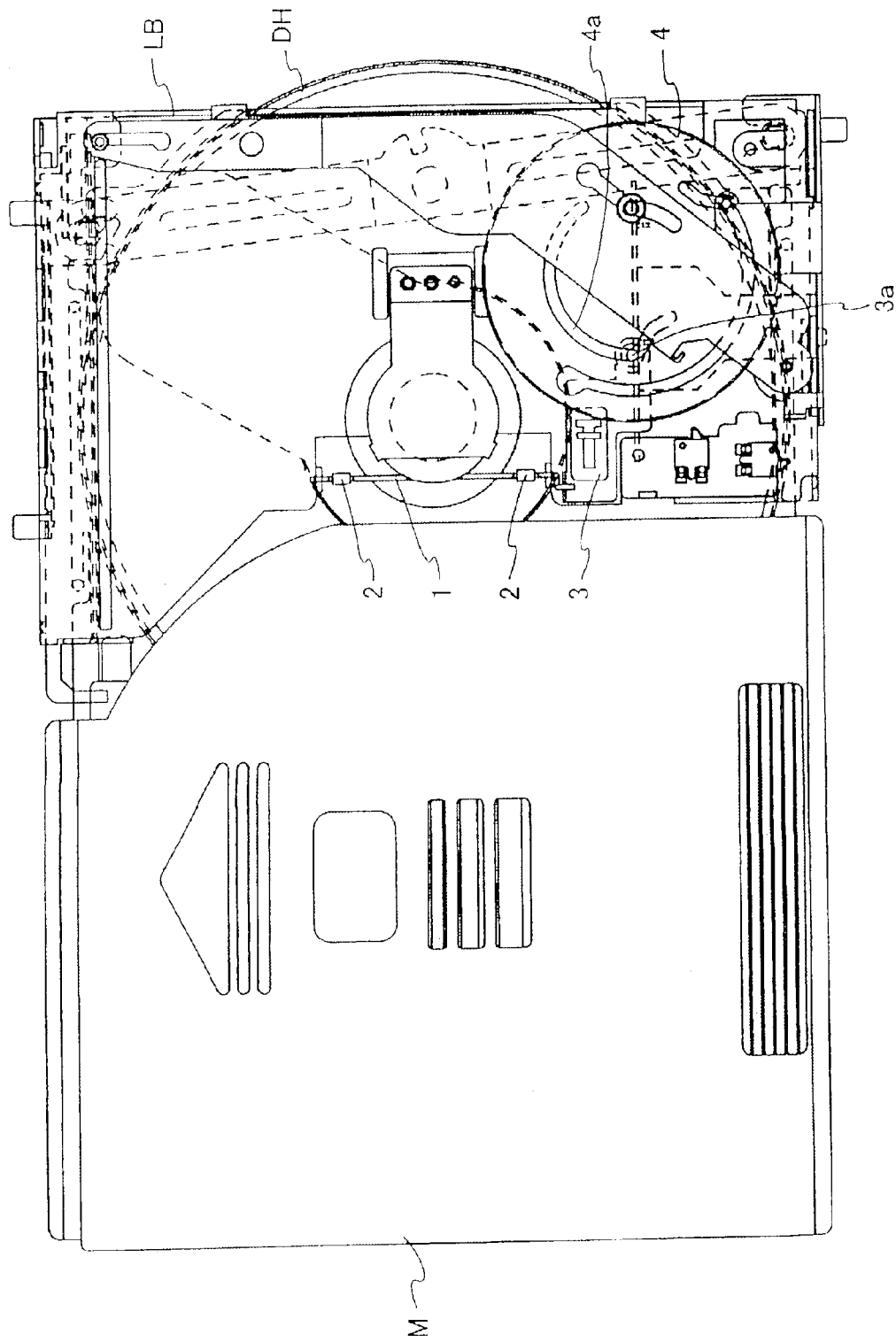
FIG. 5 is a plan view illustrating the loading action completed condition of the disk change device shown in FIG. 4.
Figure 6:
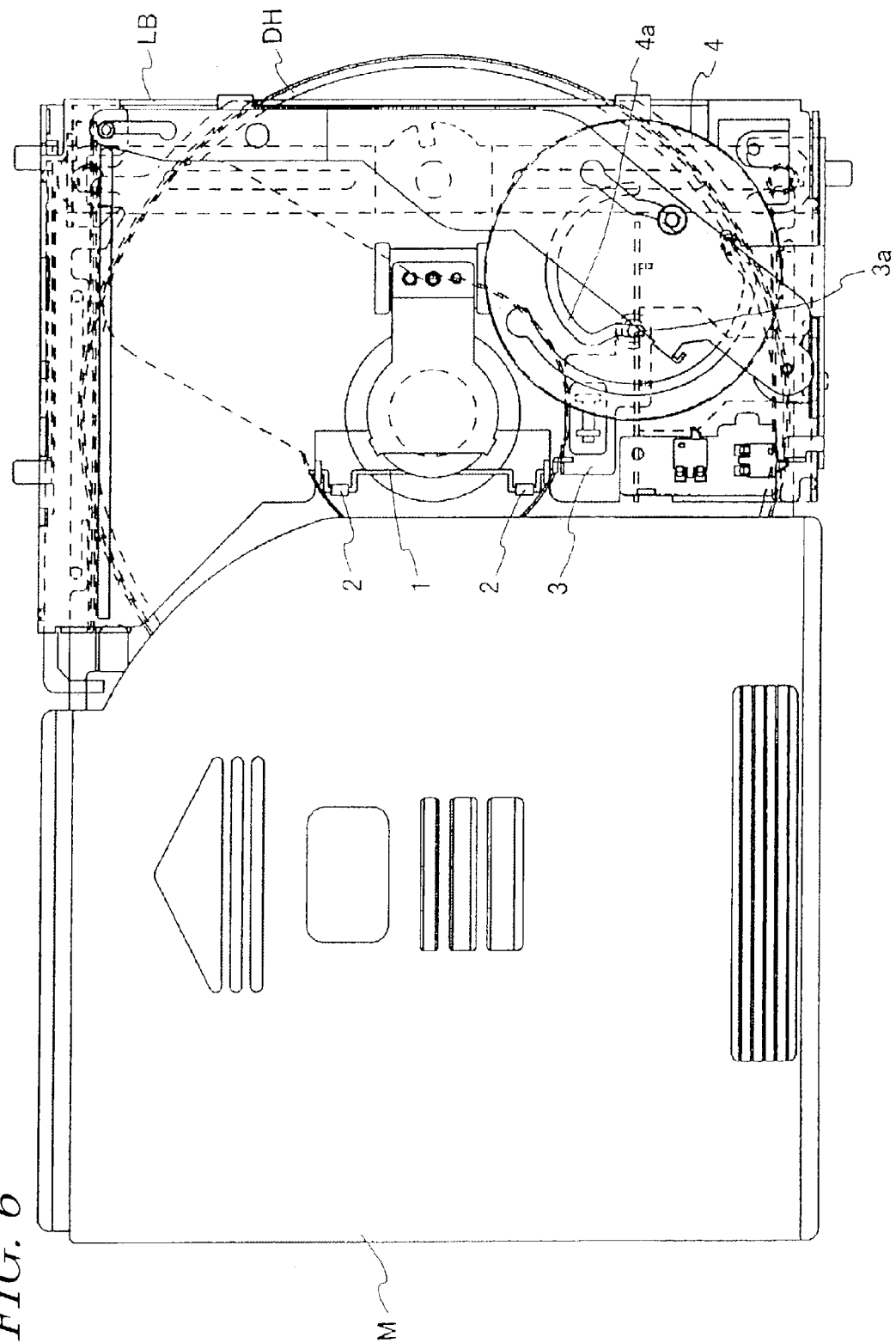
FIG. 6 is a plan view illustrating the clamping action completed condition of the disk change device shown in FIG. 4.

FIG. 3 is a side view showing the operation of the wire 1 and the rollers 2, (A) illustrating the pressing condition and (B) illustrating the release condition, respectively. Also, FIG. 4 to FIG. 6 are plan views illustrating in step fashion the disk feeding action of a disk change device having a disk holding device, FIG. 4 illustrating the initial condition, FIG. 5 the loading action completed condition and FIG. 6 the clamping action completed condition, respectively. In FIG. 4 to FIG. 6, M indicates the magazine.

Hereinbelow, the initial condition, disk holding during loading action from the initial condition and the release condition during clamping action will be successively described.

First of all, as shown in FIG. 4, in the initial condition, the large-diameter gear 4 is at the end on the anti-clockwise direction side in the drawing of its range of angle of rotation and the rollers 2 are in the pressing condition as shown in FIG. 3(A).

Whilst the large-diameter gear 4 is performing the loading action by rotating from this initial condition, the linking plate 3 is held at the end position (initial position) on the left-hand side in the drawing by the cam hole 4a, so the rollers 2 are held in the pressing position as shown in FIG. 3(A). That is, the rollers 2 are held in a condition pressing against the surface of the disk D by the urging force of the wire 1. Consequently, since, during the loading action, the rollers 2 maintain the pressing condition whilst rotating on the surface of the moving disk D, the surface on the opposite side of the disk D can be pressed against the disk holder DH by these rollers 2.

Then, at the time point where the large-diameter gear 4 has reached the loading action completed position and the loading action is thereby completed, as shown in FIG. 5, the coupling pin 3a of the linking plate 3 reaches the operation changeover position of the cam hole 4a. As a result, in the subsequent clamping action, with subsequent rotation of the large-diameter gear 4, as shown in FIG. 3(B), the wire 1 is rotated in the clockwise direction in the drawing by means of the sliding action towards the end position (accommodated position) on the right-hand side in the drawing of the linking plate 3, causing the rollers 2 to be moved to the upper i.e. the release position.

In more detail, with the sliding action of the linking plate 3, as a result of the movement of the coupling shaft 13 of the wire 1 in the same direction by the shaft 3b thereof, the wire 1 is rotated in the clockwise direction in the Figure by this swiveling shaft 12, with the result that the roller shafts 13 and rollers 2 are swiveled in the same direction about this swiveling shaft 12, allowing the rollers 2 to reach the upper i.e. the release position.

Thus, during the clamping action after completion of the loading action, the rollers 2 are shifted to the release position so that the disk D is put in a condition in which it is capable of rotation.

Next, during the clamping release action from the clamping action completed condition shown in FIG. 6, the wire 1 is rotated in the anti-clockwise direction in the drawing by means of the sliding action in the opposite direction of the linking plate 3, causing the rollers 2 to be shifted to the lower i.e. the pressing position. Consequently, during the subsequent unloading action, just as in the case of the loading action, the rollers 2 are held in the pressing position pressing against the surface of the disk D, so, just as in the case of the loading action, the surface on the opposite side of the disk D can be pressed against the disk holder DH by the rollers 2.

[1-3. Benefits]

As described above, with this embodiment, during the loading action and during the unloading action, the surface of the disk D can be pressed against the disk holder by the rollers 2. Because of this, the rollers 2 move relatively to the disk D with their surface continuously pressed against the surface of the disk D, with no possibility of their rubbing against the surface of the disk D. There is therefore no possibility of damage to the surface of the disk D or of increase of the load on the drive system during the loading action, as there was with the prior art in which a fixed plate spring was employed.

Also, since the rollers 2 are made of rubber and can absorb impacts occurring on contact of the rollers and the disk surface, the loading action and unloading action can be made more stable.

Also, since, during the clamping action, the rollers 2 are shifted from the pressing position to the release position by means of the cam hole 4a provided on the large-diameter gear 4 and the linking plate 3, there is no possibility of the disk D being, inappropriately, subjected to pressure by the rollers 2 during the subsequent disk playback action, so the disk playback action can be performed satisfactorily.

In particular, in this embodiment, by using the wire 1 as the rotary shaft of the rollers 2, the constitution in the vicinity of the disk pressing section can be made extremely compact and simplified compared with the case where the rollers 2 and the wire 1 are provided separately. Furthermore, since the processes of severing and bending the wire are easy, this is advantageous from the point of view of productivity.

Furthermore, thanks to the provision of the roller shafts 11, swiveling shaft 12 and coupling shaft 13 on the wire 1 made of wire, the wire 1 can be directly rotated by means of the sliding action of the linking plate 3 and the position of the rollers 2 can thus be changed simply by rotating the wire 1 itself.

Consequently, the constitution of the drive control section from the cam hole 4a to the wire 1 can be made compact and simplified and there is no need for a special member for changing the position of the rollers 1, so the constitution of the vicinity of the disk pressing section can be made more compact and simplified. Also, as described above, processing of the wire can easily be performed, so providing the roller shafts 11, swiveling shaft 12 and coupling shaft 13 is easy.

Furthermore, since the disk pressing section can be subjected to drive control in accordance with the rotation of the large-diameter gear 4 of the loading block LB, the position of the disk pressing section can be suitably changed over matching the operating timing of the disk feed action and/or the clamping action. In this case, drive control of the disk pressing section can easily be realized with the desired timing by selection of the dimensions and shape of the cam hole 4a provided on the large-diameter gear 4. Also, since an existing large-diameter gear 4 constituting the loading block LB is utilized, the constitution of the drive control section can be made extremely compact and simplified.

[2. Second embodiment]

[2-1. Construction]

In the first embodiment described above, the case was described in which the surface of the disk was pressed against the disk holder during disk feeding, such as during the loading action or unloading action. However, the present invention can also be applied to cases in which the surface of the disk is pressed against the disk holder during clamping.

For example, if a disk change device to which the present invention is applied comprises separate pressing means that presses the surface of the disk against the disk holder only during disk feeding but is constructed such that during the clamping action the disk is in an uncontrolled condition, it is necessary to press the disk against the disk holder in order to prevent displacement of the disk position in the uncontrolled condition. In such cases, the disk holding device according to the present invention can be adapted to press the surface of the disk against the disk holder only during clamping. And since the disk pressing section does not slide over the surface of the disk during clamping, the rollers of FIG. 2 can be dispensed with.

Figure 7:
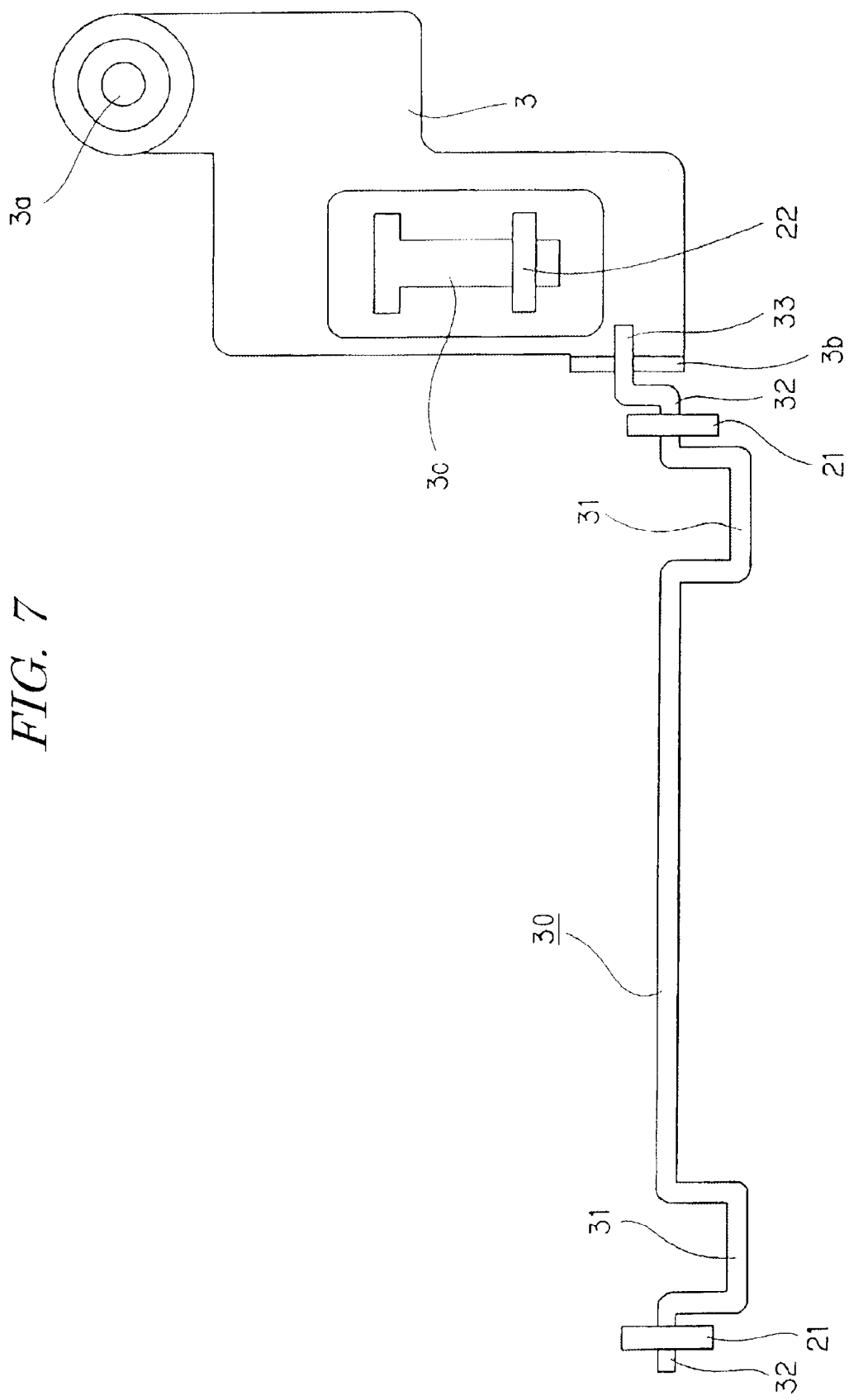
FIG. 7 is a cross-sectional view to larger scale illustrating a main part of a disk holding device according to a second embodiment of the present invention.

FIG. 7 is a cross-sectional view to a larger scale illustrating a main part of a disk holding device according to a second embodiment in which the rollers are dispensed with. As shown in this FIG. 7, in this embodiment, both the disk pressing section and the resilient body that urges this are constituted solely by a single wire 30.

In more detail, at one of the bent sections of the wire 30, there are successively formed, from the center towards the tip, a disk pressing section 31 and swiveling shaft 32. At the other bent section, there are formed, in addition to the disk pressing section 31 and swiveling shaft 32, a coupling shaft 33. That is, apart from the fact that, by removing the rollers 2 from the roller shafts 11 of FIG. 2 and using these as disk pressing sections 31, the surface of the disk D is directly pressed against by these disk pressing sections 31, the construction of the wire 30 is similar to that of the wire 1 shown in FIG. 2.

Although, in this embodiment, the construction of the other portions is similar to that in the case of the first embodiment shown in FIG. 1, it is modified in that the cam hole 4a of the large-diameter gear 4 holds the disk pressing section 31 in the release position between the loading action and the unloading action and shifts the disk pressing section 31 from the release position to the pressing position in accordance with the timing of the clamping action and the clamping release action and, in addition, restores this to the release position.

Figure 8:
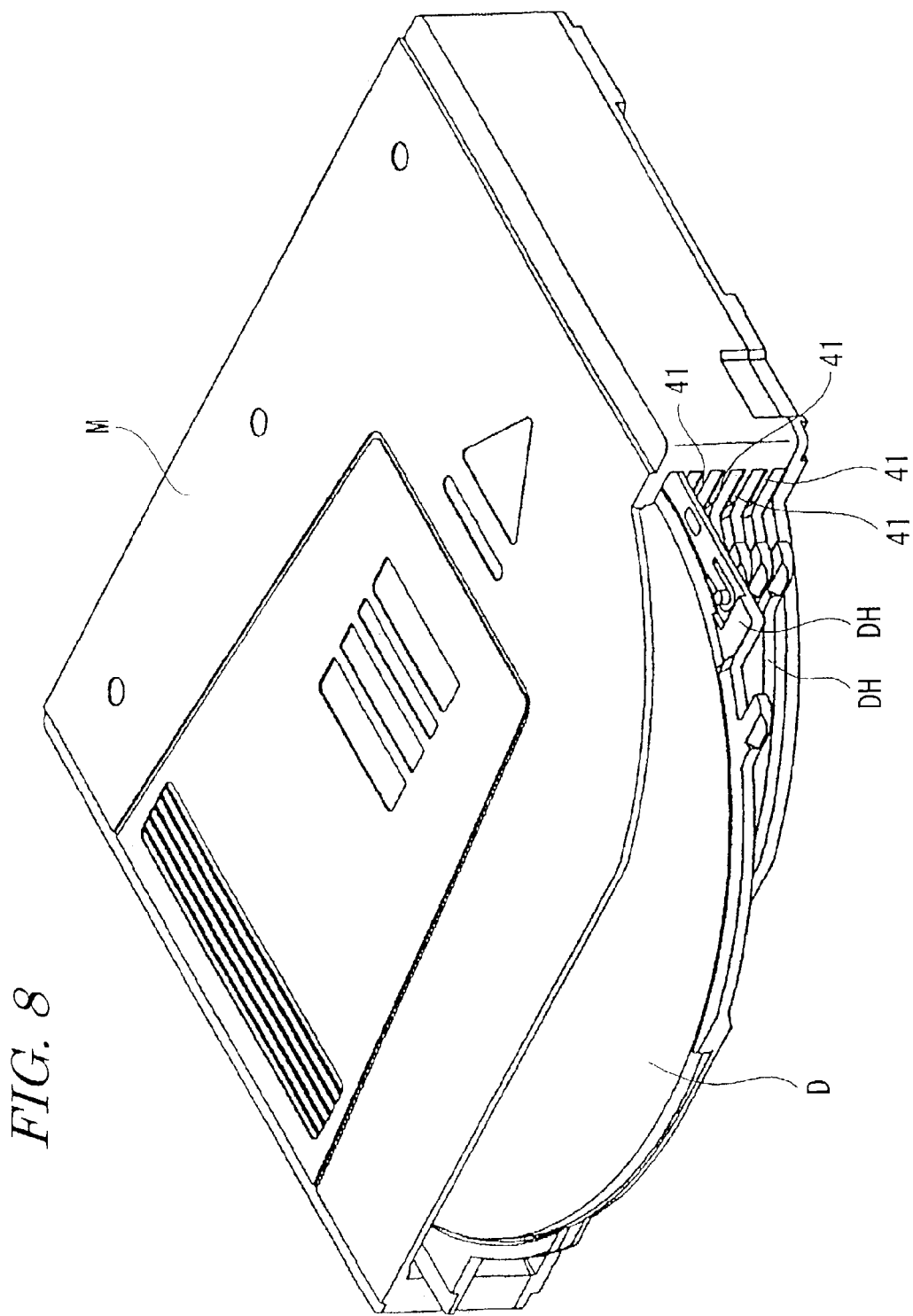
FIG. 8 and FIG. 9 are perspective views respectively showing a magazine having a construction capable of pressing the surface of the disk against a disk holder from different directions.
Figure 9:
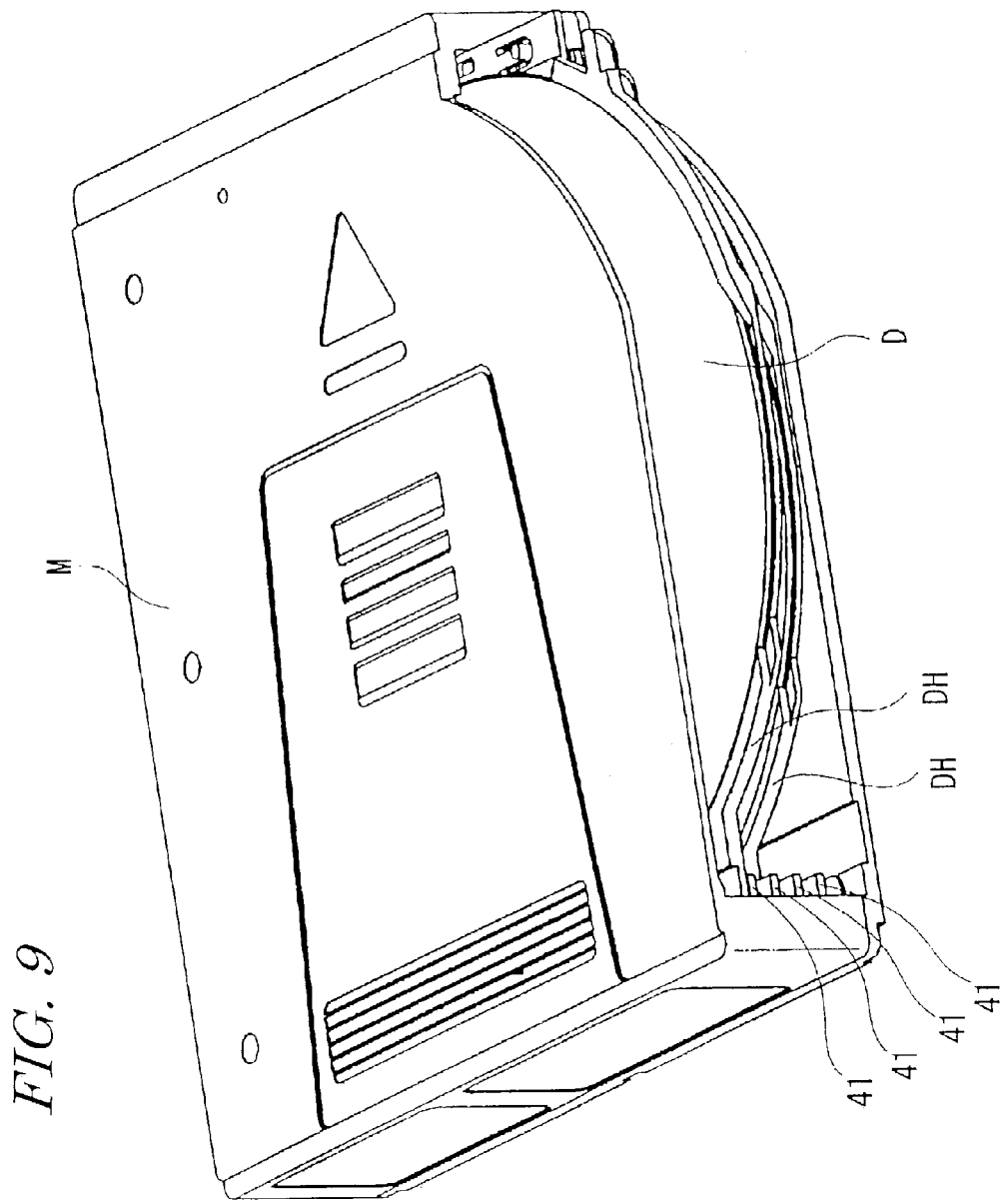

Also, as another pressing means for pressing the surface of a disk onto the disk holder during disk feeding for example a magazine M may be employed having a construction capable of pressing the disk surface against the disk holder. FIG. 8 and FIG. 9 are perspective views respectively showing such a magazine M from different directions. This magazine M comprises a holder support projection 41 that supports the left and right edges of each individual disk holder DH and is so constructed that, in a condition in which a disk holder DH holding a disk D is accommodated within the magazine M, the surface of the disk D is pressed against the disk holder DH by the holder support projection 41.

Figure 10:
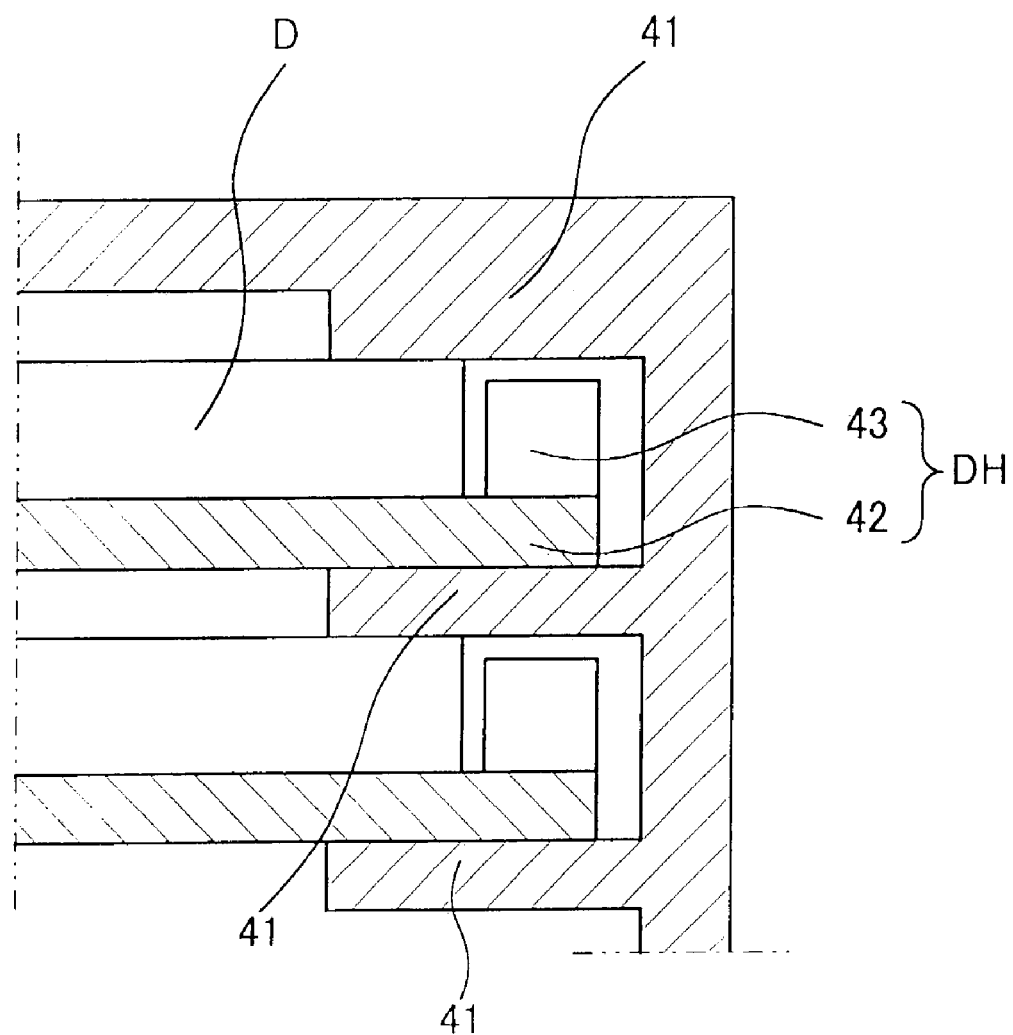
FIG. 10 is a cross-sectional view to a larger scale illustrating the principles of applying pressure to a disk using a holder support projection of the magazine shown in FIG. 8 and FIG. 9.

The principles of applying pressure to a disk using this magazine M will now be described with reference to FIG. 10. FIG. 10 is a cross-sectional view to a larger scale illustrating the principles of applying pressure to a disk by the holder support projection 41 of the magazine M shown in FIG. 8 and FIG. 9. As shown in FIG. 10, at the center of the disk holder DH, there is formed a recess having a depth substantially the same as the thickness of the disk, by a support plate 42 and side walls 43 that project upwards from the left and right edges of a support plate 42, the disk D being accommodated in this recess.

Thus, in a condition in which a disk holder DH holding a disk D is accommodated in the magazine M in this way, as shown in FIG. 10, the upper surface of the disk D is in a position substantially coplanar with the upper surface of the disk holder DH and somewhat higher than the disk holder DH. Furthermore, with a view to efficient space utilization, the distance between the adjacent holder support projections 41 of the magazine M is set to the minimum necessary dimension that will permit sliding of a disk holder DH holding a disk D without obstruction. For this reason, it is arranged that, in a condition in which a disk holder DH is accommodated in the magazine M, the disk D should be pressed against the disk holder DH by the undersurface of a holder support projection 41.

This pressed condition continues until the disk holder DH is extracted from the magazine M and the left and right edges of the disk D held by the disk holder DH are separated from the undersurface of the holder support projection 41. After this, at the time point where the disk D has reached a position in which it is capable of being clamped or a position in front of this, pressing of the disk is released in order to make it possible for the disk to be rotated.

Also, as described above, it is also possible to adopt a construction whereby, after the disk holder DH has been extracted from the magazine M and the disk D has been separated from the undersurface of the holder support projection 41, the disk is pressed against the disk holder DH by means of an equivalent member (member corresponding to the holder support projection 41) provided on the side of a mechanism such as the disk drive or the disk feed section. In this case also, at least at the time point where the disk D reaches the position in which it is capable of being clamped, pressing of the disk by the aforesaid equivalent member is released in order to enable rotation of the disk.

[2—2. Action]

Next, the operation of a disk holding device according to this embodiment constructed as above will be described.

Specifically, whilst the large-diameter gear 4 is rotated from the initial position to perform the loading action, the disk pressing section 31 of the wire 30 is held in the release position so that the pressing of the disk D is performed by means of the holder support projection 41 of the magazine M. Then, at the point where the loading action has terminated, the disk holder DH is extracted from the magazine M and, at the time point where the left and right edges of the disk D held in the disk holder DH are separated from the undersurface of the holder support projection 41 and pressing against the disk by the holder support projection 41 of the magazine M or by the equivalent member on the mechanism side is released, the disk pressing section 31 of the wire 30 is shifted into the pressing position.

In this way, during the clamping action after completion of the loading action, the disk D that has been released from the holder support projection 41 of the magazine M or the equivalent member on the mechanism side is pressed against the disk holder DH by the disk pressing section 31 of the disk holding device according to the present invention so that positional displacement of the disk D can be prevented.

In this case, in order to reliably continue with the pressing condition of the disk by different means and thereby prevent occurrence of a condition in which the disk is not subjected to pressure at the time when the clamping action is commenced, it is desirable to set the timing of the commencement of application of pressure by the disk pressing section 31 of the wire 30 during the clamping action somewhat earlier than the timing of the completion of application of pressure to the disk by the holder support projection 41 of the magazine M or by the equivalent member on the mechanism side.

It should be noted that the disk D is put in a condition in which it is capable of rotation by shifting the disk pressing section 31 to the release position during the process of clamping the disk D or after clamping has been completed.

Also, during the clamping release action, it is possible to press the disk D against the disk holder DH by means of the disk pressing section 31 of the disk holding device according to the present invention with the opposite operating timing to that of the clamping action and, in the subsequent unloading action, it is possible to press the disk D against the disk holder DH by means of the holder support projection 41 of the magazine M or an equivalent member on the mechanism side, in the same way as during the loading action.

[2-3. Benefits]

As described above, with this embodiment, when the disk change device is constituted such that it comprises separate disk pressing means during disk feed such as a holder support projection 41 of the magazine M or an equivalent member on the mechanism side and the disk is in an uncontrolled condition during clamping, with the disk holding device according to the present invention, displacement of the disk position can be prevented by pressing against the disk D during the clamping action.

Specifically, during the clamping action, displacement of the disk can be prevented by holding the disk pressing section 31 of the wire 30 in the pressing position by means of the cam hole 4a provided in the large-diameter gear 4 and the linking plate 3. Failure of the clamping action caused by displacement of the disk and/or damage to the disk or the like can therefore be prevented and the reliability of the clamping action can therefore be improved.

Furthermore, when the clamping action is completed, the disk pressing section 31 is accommodated in the release position, so, during the subsequent disk playback action, there is no possibility of the disk D being inappropriately pressed by the disk pressing section 31, so the disk playback action can be performed satisfactorily.

In particular, in this embodiment, thanks to the adoption of a construction in which the disk pressing section 31 and the resilient body that urges this are constituted solely of the wire 30, the constitution in the vicinity of the disk pressing section can be made extremely compact and simplified compared with the case where rollers 2 are employed. Also, as described above, the wire forming the wire 30 can easily be subjected to processing such as severing or bending and in this embodiment there is no need to mount rollers on the wire, so this is even more advantageous from the point of view of productivity and assembly of the device. It should be noted that it is not necessarily essential for the wire 30, that constitutes the disk pressing section 31, to have spring properties.

Furthermore, due to the utilization of a large-diameter gear 4 of the loading block LB, the same advantages are obtained as in the case of the first embodiment, in that the position of the disk pressing section can be suitably changed over matching the operating timing of the disk feed action or clamping action, in that drive control of the disk pressing section can easily be realized with the desired timing by selection of the shape and dimensions of the cam hole and in that the constitution of the drive control section can be made extremely compact and simplified due to the use of the existing large-diameter gear 4.

[3. Other Embodiments]

It should be noted that the present invention is not restricted to the embodiments described above but could be implemented in various other modified modes within the scope of the present invention. For example, in the disk holding device of the first and second embodiments, the shape of the wire could be suitably altered or, as a modified example of the first embodiment, it would be possible to provide the wire and the rollers separately or to dispense with the rollers. Also, as a modified example of the second embodiment, rollers could be added.

In all cases, it is not necessarily essential for the wire or roller to be given resilience and a suitable selection of specific materials of the wire and/or rollers may be made with this point also taken into consideration. Explaining this point further, if both wire and rollers are provided, both the wire and rollers may be given resilience but it is also possible to give resilience only to one or other of the wire and rollers, or, further, it is possible to employ wire not having resilience and rollers not having resilience. Furthermore, a spring could be provided that urges the rollers, separately from the wire that supports the rollers.

Also, for the rotary member that is utilized in the drive control section, any of the rotary members associated with the disk feed action or clamping action may be suitably employed, depending on the construction of the disk change device. In this connection, the shape of the cam provided in the rotary member is not restricted to being a cam hole and it would also be possible to provide a cam hole on the side of an operating member coupled with the disk pressing section as a coupling pin.

Furthermore, since the present invention relates to the disk holding device, there are no restrictions at all on the construction of the disk change device itself where this disk holding device is provided or on the magazine that is used therein; so long as it is necessary to press the surface of the disk against the disk holder during disk feeding or clamping, this can be applied in the same way to a disk change device having many different types of construction and the same excellent benefits obtained.

Furthermore, the operating timing of the drive control of the disk pressing section can be freely set in accordance with requirements; for example, consideration may be given to a construction in which the disk surface is pressed against the disk holder during both disk feeding and clamping.

INDUSTRIAL APPLICABILITY

As described above, with the present invention, by providing a disk pressing section that presses against the surface of a disk and a drive control section that performs drive control of this disk pressing section between a disk pressing position and a release position, a disk holding device can be provided that is capable of pressing the surface of a disk against a disk holder and which is of high operating reliability and which is compact and simplified and capable of wide application to disks having non-standard dimensions, without causing damage of the disk surface during disk feeding or clamping and without increasing the load on the drive system.

What is claimed is:

1. A disk holding device for a disk change device capable of accommodating a plurality of disk holders that carry disks, that presses the surface of a disk against a disk holder during disk feeding and/or clamping, comprising:
   a disk pressing section arranged so as to be capable of operation between a pressing position where the disk pressing section is pressed against the surface of the disk and a release position where it is released from the disk;
   a drive control section that performs drive control of said disk pressing section between the pressing position and the release position; and
   a wire having spring properties adapted to urge said disk pressing section,
   wherein the wire has an operating shaft that supports the disk pressing section and a swiveling shaft arranged in parallel with a gap between the shafts, wherein the wire is driven by the drive control section and rotated such that the operating shaft is swiveled about the swiveling shaft, allowing the disk pressing section to operate between the pressing position and the release position.

2. The disk holding device according to claim 1, wherein the disk pressing section is a rotatable roller and the operating shaft of the wire is a rotary shaft that rotatably supports the roller.

3. The disk holding device according to claim 2, wherein said roller is formed of resilient material.

4. The disk holding device according to claim 1, wherein said disk pressing section is the operating shaft of the wire.

5. The disk holding device according to claim 1, wherein said drive control section comprises a cam provided in a rotary member for disk feeding and/or clamping and an operating member that is driven by this cam and performs drive control of the disk pressing section between said pressing position and release position.

6. The disk holding device according to claim 1, wherein said drive control section is adapted to control said disk pressing section to the pressing position at least during disk clamping.

7. The disk holding device according to claim 2, wherein said drive control section comprises a cam provided in a rotary member for disk feeding and/or clamping and an operating member that is driven by this cam and performs drive control of the disk pressing section between said pressing position and release position.

8. The disk holding device according to claim 3, wherein said drive control section comprises a cam provided in a rotary member for disk feeding and/or clamping and an operating member that is driven by this cam and performs drive control of the disk pressing section between said pressing position and release position.

9. The disk holding device according to claim 4, wherein said drive control section comprises a cam provided in a rotary member for disk feeding and/or clamping and an operating member that is driven by this cam and performs drive control of the disk pressing section between said pressing position and release position.

10. The disk holding device according to claim 2, wherein said drive control section is adapted to control said disk pressing section to the pressing position at least during disk clamping.

11. The disk holding device according to claim 3, wherein said drive control section is adapted to control said disk pressing section to the pressing position at least during disk clamping.

12. The disk holding device according to claim 4, wherein said drive control section is adapted to control said disk pressing section to the pressing position at least during disk clamping.

13. The disk holding device according to claim 5, wherein said drive control section is adapted to control said disk pressing section to the pressing position at least during disk clamping.

14. In a disk player having a disk change device for holding a plurality of disk holders, each disk holder storing a disk that can be selectively played by removing a disk from a disk holder and securing the disk on a turntable, the improvement of a releasable disk securement unit comprising:
   a disk pressing member for contacting the disk and biasing the disk against a support surface as the disk is moved from the disk holder until it is clamped on the turntable including an integral shaft with a central section extending in a straight-line and bent sections at respective ends of the shaft, one of the bent sections rotatably supports a roller member at a position off axis from the central section, the integral shaft further includes a swiveling shaft arranged in parallel with the bent section; and
   a drive control section for moving the disk pressing member from a non-engagement position to an engagement position during the movement of the disk from the disk holder to the turntable including a linking member that engages and rotates the swiveling shaft.

15. The disk player of claim 14, wherein the roller member rotates across a disk surface relative to the movement of the disk.

16. The disk player of claim 15, wherein two disk pressing members rotate across the disk surface.

17. The disk player of claim 16, wherein the disk pressing members are supported on bent sections that rotate toward a disk contact position and a disk release position.

18. The disk player of claim 17, wherein the integral shaft is formed of an elongated wire member having a crank shape.

19. The disk player of claim 18, wherein the roller members are resilient and the wire member is resilient.

20. The disk player of claim 19, wherein the drive control section includes a cam member pivotally connected to a sliding plate with a slot for engaging the crank shape to rotate the bent sections.

* * * * *